(12) United States Patent
Lee

(10) Patent No.: US 7,539,908 B2
(45) Date of Patent: May 26, 2009

(54) APPARATUS HAVING FUNCTION OF CHECKING ERROR IN COPYING OR MOVING FILE AND METHOD THEREOF

(75) Inventor: Hyung-Chul Lee, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 403 days.

(21) Appl. No.: 11/435,418

(22) Filed: May 16, 2006

(65) Prior Publication Data
US 2006/0265450 A1 Nov. 23, 2006

(30) Foreign Application Priority Data
May 17, 2005 (KR) ............... 10-2005-0041181

(51) Int. Cl.
*G06F 11/00* (2006.01)
(52) U.S. Cl. .......................... 714/48
(58) Field of Classification Search ........... 714/2–6, 714/8, 13, 15, 20, 39, 42, 48, 57
See application file for complete search history.

(56) References Cited

U.S. PATENT DOCUMENTS

| | | | | |
|---|---|---|---|---|
| 5,878,050 | A * | 3/1999 | Brahme et al. | 714/719 |
| 5,901,320 | A | 5/1999 | Takahashi et al. | |
| 6,058,047 | A * | 5/2000 | Kikuchi | 365/185.33 |
| 7,082,548 | B2 * | 7/2006 | Nakano | 714/6 |
| 7,350,044 | B2 * | 3/2008 | Keays | 711/165 |
| 2002/0049726 | A1 | 4/2002 | Cork et al. | |
| 2003/0140288 | A1 | 7/2003 | Loaiza et al. | |
| 2004/0033059 | A1 * | 2/2004 | Kim et al. | 386/113 |

FOREIGN PATENT DOCUMENTS

JP 1998-084401 5/1998
KR 2000-0044454 7/2000

* cited by examiner

*Primary Examiner*—Nadeem Iqbal
(74) *Attorney, Agent, or Firm*—H.C. Parl & Associates, PLC

(57) ABSTRACT

An apparatus having a function of checking an error in copying or moving a file and a method thereof are disclosed. The apparatus includes: a first storing unit for storing data to drive the apparatus; a second storing unit for backing up the stored data in the first storing unit; and a controller for detecting an error in the backup data after backing up the data from the first storing unit to the second storing unit.

4 Claims, 2 Drawing Sheets

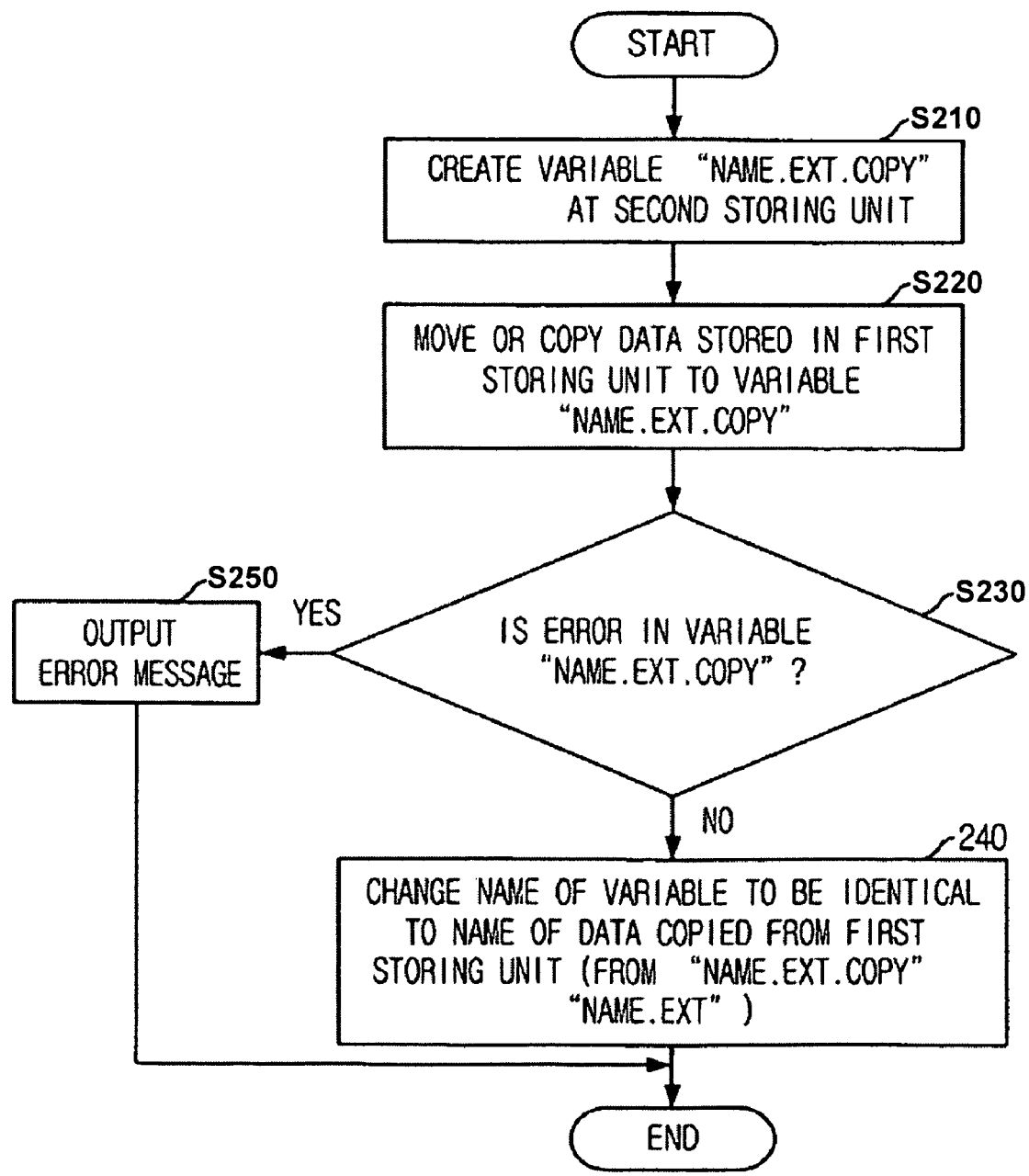

APPARATUS HAVING FUNCTION OF CHECKING ERROR IN COPYING OR MOVING FILE AND METHOD THEREOF

CROSS REFERENCE TO RELATED APPLICATION

This application claims priority from and the benefit of Korean Patent Application No. 10-2005-0041181, filed on May 17, 2005, which is hereby incorporated by reference for all purposes as if fully set forth herein.

FIELD OF THE INVENTION

The present invention relates to an apparatus for checking an error in copying or moving a file and a method; and, more particularly, to an electronic apparatus having a function of inspecting a file whether the file is damaged on not while the file is copying or moving.

DESCRIPTION OF RELATED ARTS

An electronic apparatus is an electronic device having a memory, such as a wireless communication terminal, a notebook computer, a camcorder, a digital camera and a portable multimedia player (PMP).

A wireless communication terminal is a portable terminal capable of transmitting/receiving voice, text and image data through a wireless communication network. Such a wireless communication terminal may be a mobile communication terminal, a personal communication service (PCS) terminal, a personal digital assistant (PDA), a smart phone, a next generation mobile terminal for IMT-2000, and a wireless local area network (LAN) terminal.

Hereinafter, a wireless communication terminal is used as an example of the electronic device to describe present invention as well as the related art thereof.

Among the advantages of a wireless communication terminal, the mobility is most attractive advantage of the wireless communication terminal. The mobility makes the wireless communication terminal popular, and accordingly, the number of subscribers for wireless communication services dramatically increases. Recently, the wireless communication terminal is commonly used among the mass of people.

Although the mobility made the wireless communication terminal popular, the users are not satisfied with the existing functions of the wireless communication terminal. The users of the wireless communication terminal continue to expect more usable functions in the wireless communication terminal.

In order to satisfy such expectations of the users, many manufacturers introduce wireless communication terminals having various supplementary functions such as a radio broadcasting signal receiving function, a music reproducing function, a message function, a blood sugar level detecting function, and an ultrasound photographing function.

These functions require a main memory having a mass storage capacity to store data produced while performing the supplementary functions, and also require a secondary memory such as a secure digital (SD) card, or a transflash memory (T-Flash), to transfer the data stored in the main memory of the wireless communication terminal to a host computer by copying or moving the stored data from the main memory to the secondary memory.

While copying or moving the stored data in the main memory to the secondary memory, the data may be damaged by hardware fault or software fault.

However, there is no method introduced to inspect the data whether the data is damaged or not. Therefore, such a damaged data causes malfunction of an electronic device.

SUMMARY OF THE INVENTION

It is, therefore, an object of the present invention to provide an apparatus having a function of inspecting data whether the data is damaged or not while the data is copying or moving from a main memory of the apparatus to a secondary memory in order to prevent an electronic device from being malfunctioned by the damaged data.

In accordance with an aspect of the present invention, there is provided an apparatus having a function of checking an error in copying or moving a file including a first storing unit for storing data to drive the apparatus; a second storing unit for backing up the stored data in the first storing unit; and a controller for detecting an error in the backup data after backing up the data from the first storing unit to the second storing unit.

In accordance with an aspect of the present invention, there is also provided a method of checking an error in copying or moving a file including: creating a variable in a second storing unit; moving data stored in a first storing unit to the variable in the second storing unit; inspecting the moved data in the second storing unit whether an error is in the moved data; and changing a name of the created variable to be identical to the data stored in the first storing unit if the error is not detected.

BRIEF DESCRIPTION OF THE DRAWINGS

The above and other objects and features of the present invention will become better understood with regard to the following description of the preferred embodiments given in conjunction with the accompanying drawings, in which:

FIG. 2 is a flowchart of a method of checking an error in copying and moving a file in accordance with a preferred embodiment of the present invention.

DETAILED DESCRIPTION OF THE INVENTION

Figure 1:
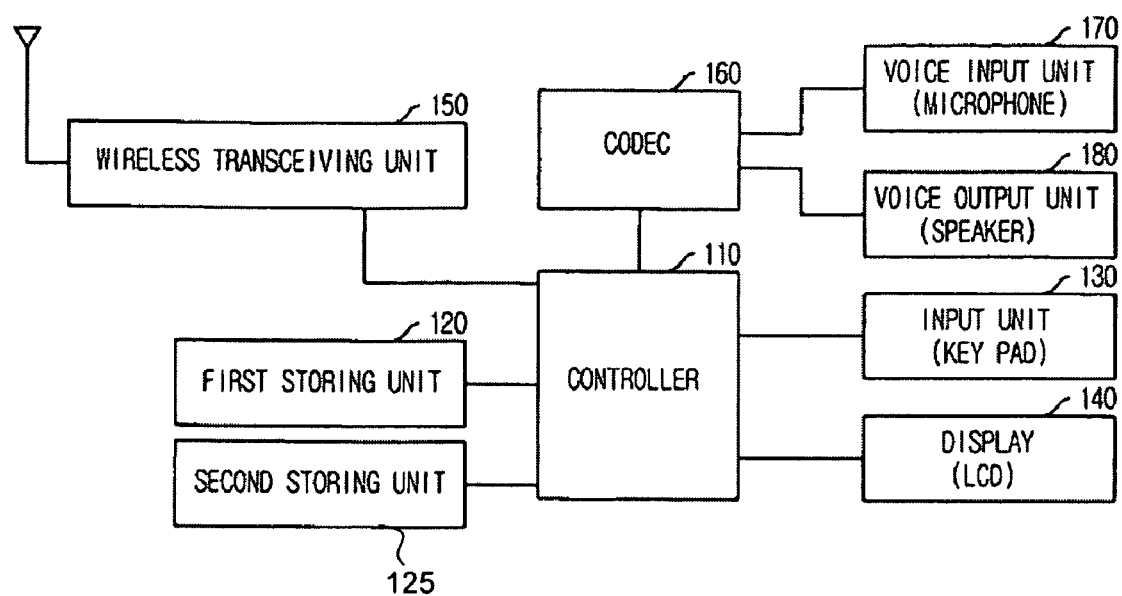
FIG. 1 is a block diagram of a wireless communication terminal having a function of checking an error in copying or moving a file in accordance with a preferred embodiment of the present invention.

Hereinafter, an apparatus having a function of checking error in copying or moving a file will be described in more detail with reference to the accompanying drawings.

FIG. 1 is a block diagram of a wireless communication terminal having a function of checking an error in copying or moving a file in accordance with a preferred embodiment of the present invention.

As shown in FIG. 1, the wireless communication terminal according to the present embodiment includes a wireless transceiving unit 150 for receiving contents through a wireless communication network; a first storing unit 120 for storing data to drive the wireless communication terminal; a second storing unit 125 for backing up data stored in the first storing unit 120; a controller 110 for inspecting the data to find a level of damage in the data after backing up the data from the first storing unit 120 to the second storing unit 125; an input unit 130 such as a key pad for receiving menu-selection information through buttons; a display 140 such as a liquid crystal display (LCD) for outputting information on a screen in response to the controller 110; a CODEC 160 for receiving a signal from the wireless transceiving unit 150, converting the received signal to a voice and outputting the voice through a voice output unit 180, receiving a voice through a voice input unit 170, and converting the voice to a signal and transferring the signal to the wireless transceiving unit 150; the voice output unit 180 such as a speaker for receiving the voice received from the CODEC 160 and outputting the voice; and the voice input unit 170 such as a microphone for receiving the voice from a user and transferring the voice to the CODEC 160.

The first storing unit 120 stores a driver program of a controller 110 and a system program, and the driver program and the system program can be stored in a read only memory (ROM) area and can be deleted from the ROM area, generally. The first storing unit 120 includes a random access memory (RAM) for temporally storing contents generated while performing various operating programs.

The second storing unit 125 may be a secure digital (SD) card or a Transflash memory (T-Flash). The second storing unit 125 includes a supplementary memory for storing backup data which was stored in the first storing unit 120.

The input unit 130 may be a keypad configured of various numeral or text keys, menu keys and function keys for performing various functions. The input unit 130 is an interface between the wireless communication terminal and a user. The input unit 130 receives inputs of a user through the various keys of the input unit 130 and transfers the received inputs to the controller 110.

The controller 110 generally controls the components of the wireless communication terminal. The controller 110 also copies and moves files stored in the first storing unit 120 to the second storing unit 125 in order to backup the data stored in the first storing unit 120 to the second storing unit 125. After backing up, the controller 110 inspects the backup data whether the backup data is damaged by hardware fault or software fault in order to prevent the wireless communication terminal from being malfunctioned.

The controller 110 uses a cyclic redundancy checking method (CRC) or a parity checking method to detect an error in a file copied or moved from the first storing unit 120 to the second storing unit 125.

Hereinafter, the present invention will be described with the CRC method being used as an example of the method of checking an error in copying and moving a file in accordance with a preferred embodiment of the present invention.

The display 140 is a display of a wireless communication terminal such as a liquid crystal display (LCD). The display 140 displays states of the wireless communication terminal or states of progression of corresponding program in response to the controller 110. That is, the display 140 displays general state of the wireless communication terminal or displays information inputted through the input unit 130.

FIG. 2 is a flowchart of a method of checking an error in copying and moving a file in accordance with a preferred embodiment of the present invention.

It assumes that a file having a name of "NAME.EXT" is copied from the first storing unit 120 to the second storing 125.

Referring to FIG. 2, the controller 110 creates a variable named as "NAME.EXT.COPY" in the second storing unit 125 at step S210.

The present invention is not limited by such a name of the variable. It is obvious to those skilled in the art that the name of the variable may vary and be modified in various forms.

The generation of the variable generally means the allocation of a memory space. Therefore, if the variable is created, a predetermined size of memory space is allocated to the created variable according to a type of the variable as a name of "NAME.EXT.COPY". Therefore, data can be copied or moved into the allocated memory space.

After creating the variable, the controller 110 moves or copies the contents of the file "NAME.EXT" stored in the first storing unit 120 to the variable "NAME.EXT.COPY" at step S220.

After completely copying or moving the contents of the file "NAME.EXT" from the first storing unit 120 to the second storing unit 125, the controller 110 performs the CRC to inspect the copied file "NAME.EXT.COPY" whether an error is generated in the contents of the copied file while copying the contents of the file "NAME.EXT.COPY" to the second storing unit 125 at step S230.

If the error is not detected at step S230, the controller 110 changes a name of the copied file "NAME.EXT.COPY" to a name "NAME.EXT". That is, the controller 110 changes the name of the variable in the second storing unit 125 identically to the name of file stored in the first storing unit 120 at step S240.

If the error is detected at step S230, the controller 110 outputs an error message at step S250 to notice the generation of the error to the user.

Therefore, a user may recognize that the error is generated while the file is moving or copying from the first storing unit 120 to the second storing unit 125 when the storing unit 125 does not include a file having the same name of the file stored in the first storing unit 120. Also, the user may recognize that the file is normally copied or moved into the second storing unit 125 when the file having the name identical to that of the file stored in the first storing unit 120 is stored in the second storing unit 125.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. KR 2005-0041181, filed in the Korean patent office on May 17, 2005, the entire contents of which being incorporated herein by reference.

As described above, the wireless communication terminal can be prevented from being malfunctioned by performing the method of checking the error in the copied or the moved file according to the present invention.

While the present invention has been described with respect to certain preferred embodiments, it will be apparent to those skilled in the art that various changes and modifications may be made without departing from the spirits and scope of the invention as defined in the following claims.

What is claimed is:

1. An apparatus having a function for checking an error in copying or moving a file, comprising:
   a first storing unit to store first data to drive the apparatus;
   a second storing unit to back up the first data from the first storing unit as backup data; and
   a controller to detect an error in the backup data after backing up the first data from the first storing unit to the second storing unit,
   wherein the controller creates a variable in the second storing unit and changes a name of the created variable to be identical to the first data stored in the first storing unit after backing up the first data from the first storing unit to the second storing unit if the error is not detected in the backup data.

2. The apparatus as recited in claim 1, wherein the controller detects the error in the backup data in the second storing unit through a cyclic redundancy checking (CRC).

3. A method for checking an error in copying or moving a file, comprising:

creating a variable in a second storing unit;

moving data stored in a first storing unit to the variable in the second storing unit;

inspecting the moved data in the second storing unit to determine whether an error is in the moved data; and changing a name of the created variable to be identical to the data stored in the first storing unit if the error is not detected.

4. The method as recited in claim 3, wherein in the inspecting of the moved data, a cyclic redundancy checking (CRC) is performed to detect the error in the moved data.

* * * * *